Feb. 27, 1945. J. L. GRANT 2,370,304
STRUCTURE TO BE PORCELAINED AND METHOD OF PRODUCING SAME
Filed July 31, 1942
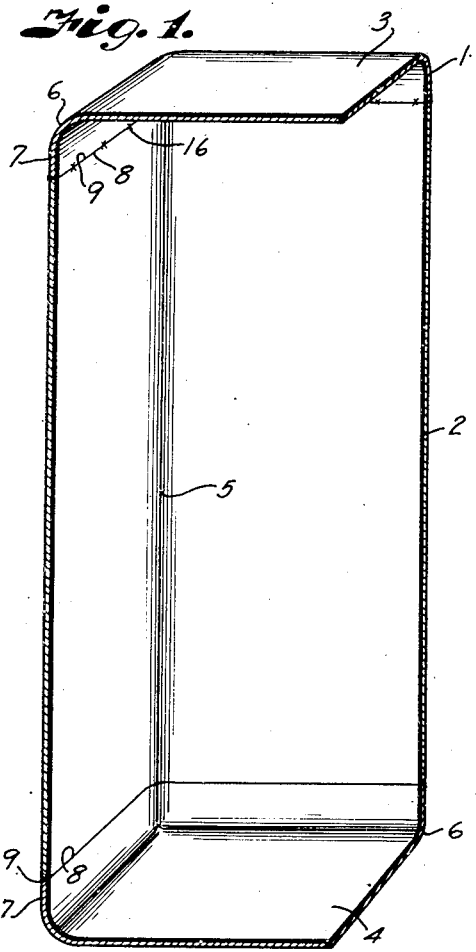
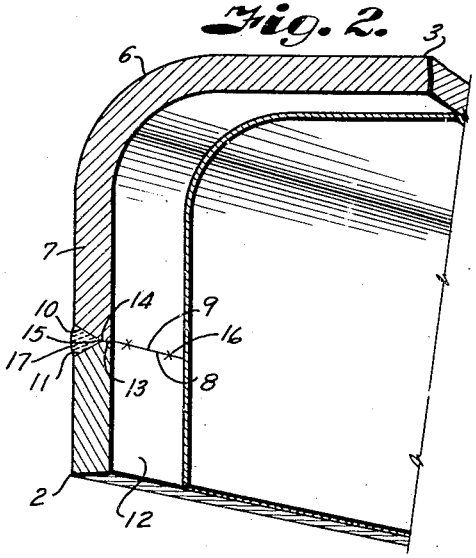
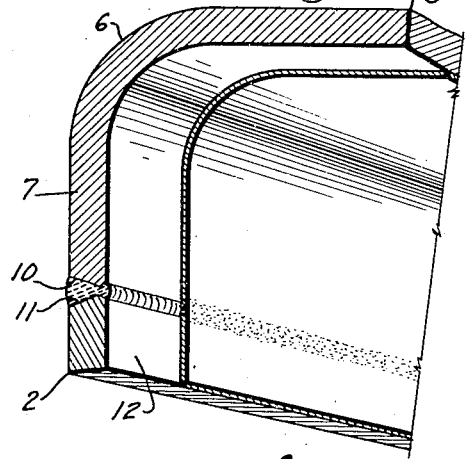
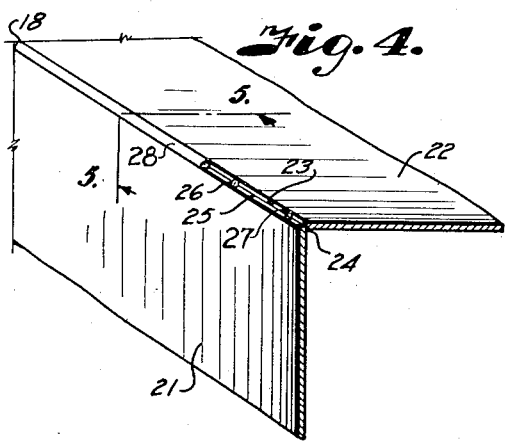
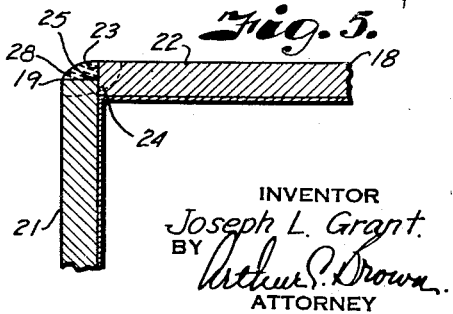
INVENTOR
Joseph L. Grant.
BY
Arthur P. Brown
ATTORNEY Patented Feb. 27, 1945

2,370,304

UNITED STATES PATENT OFFICE 2,370,304

STRUCTURE TO BE PORCELAINED AND METHOD OF PRODUCING SAME

Joseph L. Grant, Jackson County, Mo., assignor to Koch Butchers' Supply Company, North Kansas City, Mo., a corporation of Missouri Application July 31, 1942, Serial No. 452,985

6 Claims. (Cl. 220—67)

This invention relates to structures to be porcelained, particularly refrigerator liners, and to a method of producing the same, the principal object being to provide a structure of this character wherein the surfaces and seams are adapted to be covered with a uniform porcelain coating free of roughness, pin holes and other defects.

In constructing refrigerator liners and the like, care is taken to obtain a special enameling metal having a composition particularly suitable to porcelaining. The metal sheets are then carefully cut and shaped, after which they are held in specially constructed jigs with the edges thereof in registry so that the seams may be welded. These jigs are extremely expensive and add considerably to the cost of the liners, and unless a large quantity of liners is being produced the cost is prohibitive. Furthermore, the welds could not be effected by the less expensive arc welding process for the reason that enameling iron is highly conductive of heat, causing the metal to warp and the weld to burn through to the surface to be coated with porcelain. This not only affects the composition of the metal but it results in blow holes, gas pockets, slag, arc craters and other impurities and roughness of the welds, which require removal by a great amount of grinding and even then the porcelain cannot be successfully applied because of the difference in composition of the welding metal and the changed composition of the metal sheets along the welded seam.

To overcome these difficulties I have provided an improved method which does not involve expensive jigs and which permits of arc welding of the seams in such a manner that the surface to be coated with porcelain is not affected by the welds.

In accomplishing these and other objects of the invention, as hereinafter pointed out, I have provided an improved sheet metal structure and method of making the same as illustrated in the accompanying drawing, wherein:

Fig. 1 is a fragmentary sectional view through a portion of a refrigerator lining constructed in accordance with the present invention and prior to application of the porcelain coating.

Fig. 2 is an enlarged section through a corner of the lining, particularly illustrating one of the welded seams and showing the porcelain coating applied thereover.

Fig. 3 is a similar section through a liner arc welded in accordance with standard practice and showing the irregular surfaces and pin holes which result in applying the porcelain over the seam.

Fig. 4 is a fragmentary view through a corner portion of a liner embodying a modified form of the invention.

Fig. 5 is an enlarged section on the line 5—5 of Fig. 4.

Referring more in detail to the drawing:

1 designates a structure to be porcelained, particularly a refrigerator lining. The liner is formed of sheet metal and has vertical walls 2 forming the sides thereof, which are closed at the ends by a top 3 and a bottom 4. In small refrigerators the vertical wall 2 may be formed of a single wrapper sheet bent to provide rounded corners 5, however, in larger refrigerators the vertical walls may be formed of a plurality of sheets secured together by a method of welding, later described.

The tops 3 and 4 may be formed of single sheets of metal sheared square and to accurate dimensions, after which marginal edges thereof are rolled laterally from the plane of the sheets, as indicated at 6, to form flanges 7 having edges 8 abutting against corresponding edges 9 of the vertical walls. The edges 8 are preferably close to a tangent of the rolls 6, and the rolls, being stiff and rigid and in an ever-changing plane, keep buckling and warping of the sheets to a minimum when the edges 8 and 9 are welded together, as now to be described.

After the edges 8 and 9 are brought together they are first spot welded in a resistance welder at spaced points along the seam, as indicated at 16, to hold the parts together while the welding material is being applied along said edges. The spot welds 16 are small in area and do not heat the metal with sufficient intensity to destroy the carbon content of the metal or form the rough and irregular surfaces of an ordinary arc weld. Also the electrodes of the welder hold the edges in registry with each other and when the spotting is completed the tops and bottoms hold the shape of the liner without the use of a jig. Shrinking of the metal upon cooling of the spots draws the edge portions 8 and 9 together so that any space therebetween is completely closed to escape of welding metal when the weld is completed by arc welding. The edges 8 and 9 are now welded together with an arc weld whereby welding material is run along the outer seam at the outer surfaces of the metal sheets to effect union thereof. The arc is started at one end of the seam and welding metal is deposited along the length of the seam at such a rate that the heat effects fusion of the metal only part way through the sheets as indicated by the converging lines 10 and 11 which leaves the inner surfaces 12 of the sheets unaffected, however, the heat is sufficient to unite the inner portions 13 and 14 of the edges 8 and 9 to effect union thereof. In making the weld, the arc is not struck upon the liner but upon a cold rolled plate placed on the liner one-half inch from the seam. After striking the arc it is transferred to the seam and followed through until the welding rod is used up. When the rod is used up a long arc is drawn to avoid leaving a crater. Before proceeding with the welding, the terminus of the weld is cleaned first with a chipping hammer and then with a wire brush. The welding is then continued along the seam. Therefore the welding material does not burn between the contacting portions 13 and 14 or dilute the parent metal near the surface 12 to be porcelained and cause the irregular and pitted surfaces shown in Fig. 3.

In effecting a weld for a standard gauge refrigerator lining, I utilize a 3/32 inch rod with a current setting of 22½ volts, 55 amperes, S. P. I find that this gives sufficient heat to effect a successful weld without heating the inner surfaces of the metal sheets to the point where the carbon content is affected. After the welding is completed very little grinding is necessary to true the interior surfaces for coating with porcelain. When completed the porcelain extends uniformly across the seam and is entirely free of imperfections as in the case of the customary method of welding shown in Fig. 3.

Attention is directed to the fact that if the metal sheets are relatively thick, the outer edges are beveled to provide a groove of sufficient depth so that when the welding metal is applied therein the heat penetrates through the metal sufficiently to effect a complete weld up to the inner surfaces without burning through of the welding metal.

In Figs. 4 and 5 is shown a portion of a refrigerator lining 18 having square corners 19. In this case the edges of the sheets forming the side 21 and top walls 22 are lapped, that is the inner face 23 of one sheet abuts against the edge face 24 of an adjoining sheet as shown in Fig. 5, the lap being such that there is sufficient metal 25 between the inner corners and the base of the welding groove 26 to prevent excessive heating and the surfaces that might cause burning through of the welding metal or change in the carbon content of the parent metal. In this instance the sheets are placed in a clamp while they are tack welded at a series of points, as indicated at 27, after which the groove 26 is filled in with welding metal 28 with sufficient rapidity to avoid overheating the inner surfaces of the sheets which are to be coated. After completion of the welds, the liner is coated with porcelain and fired as in conventional manner.

From the foregoing it is obvious that I have provided a porcelain structure which may be economically produced with a minimum of labor and in which the porcelain is readily applied over the seams. The present method is well adapted to the use of the small manufacturer to compete with the large manufacturer as an expensive jig is not required, consequently a small number of liners may be produced at a cost comparing favorably with cost of refrigerator liners made in large quantities according to old methods.

What I claim and desire to secure by Letters Patent is:

1. The method of welding relatively thin metal sheets together which are to be porcelained on selected surfaces thereof including supporting relatively thin sheets of metal with the edges to be welded in abutting contact with the surfaces of the sheets adjacent said edges in registry, forming electric resistance spot welds by passing an electric welding current through said abutting edges at spaced locations along the length of said edges for enhancing said abutting contact upon cooling of said welds, and depositing a welding metal along said edges on the sides of the sheets opposite the surfaces to be porcelained by means of an electric arc from a current of a voltage and amperage to prevent burning through of said abutting edges by said welding metal to the surfaces to be porcelained.

2. The method of producing a relatively thin sheet metal lining to be porcelained on the interior thereof including bending a sheet of metal to form walls for said lining, forming lateral flanges on marginal edges of top and bottom sheets, bringing edges of said flanges into abutting registry with the edges of the sheet forming the first mentioned walls, forming electric resistance spot welds in said abutting edges by passing an electric welding current through said contacting edges at selected points therealong, depositing welding metal by means of an electric arc along said contacting edges at the outer faces of said lining, and controlling said electric arc to prevent burning of the welding metal through the contacting edges to the interior side to be porcelained.

3. The method of producing a relatively thin sheet metal lining including bending a sheet of metal to form side walls for said lining, forming lateral flanges on marginal edges of top and bottom sheets to form a top and bottom for said lining, bringing edges of said flanges on said top and bottom sheets into abutting registry with the edges of the sheets forming the side walls, forming electric resistance spot welds in said edges by passing a welding current through said contacting edges at selected points therealong for enhancing contact of said edges upon cooling of the spot welds, and depositing welding metal by means of an electric arc along said contacting edges at the outer faces of said lining.

4. The method of producing a relatively thin sheet metal lining including bending marginal edges of a sheet of metal in rounding curves to form lateral flanges, forming a sheet of metal to provide side walls having edges registering with edges of said flanges, bringing the edges of said flanges and said side walls into abutting electrical contact, forming electric resistance spot welds by passing a welding current through the contacting edges of said sheets at spaced points along said edges, and depositing a welding metal along said edges by means of an electric arc with sufficient rapidity and with an electric current having a value to prevent burning through of the welding metal from one surface of the lining to the other.

5. A relatively thin sheet metal lining for refrigerators including sheet metal side walls having upper and lower edges, top and bottom panels having edges in abutting contact with edges of said side walls, electric resistance spot welds connecting the edges at spaced points along said contacting edges, and a welding metal connecting said edges along the exterior side of said liner and having a fusion depth with the sheet metal of the lining less than the thickness of the metal.

6. A relatively thin sheet metal lining for refrigerators including sheet metal side walls having upper and lower edges, top and bottom panels having lateral marginal flanges terminating in edges in abutting contact with and registering coextensively with the edges of the side walls, electric resistance spot welds connecting the edges at spaced points along said abutting edges, and welding metal connecting said edges along the exterior side of said liner and having a fusion depth with the sheet metal of the lining less than the thickness of the metal.

JOSEPH L. GRANT.